(12) United States Patent
Walhovd (10) Patent No.: US 7,823,328 B2
(45) Date of Patent: Nov. 2, 2010

(54) AEROPONIC PLANT GROWING SYSTEM

(76) Inventor: Zack Allen Walhovd, 1202 Aspen Pl., Sun Prairie, WI (US) 53590

( * ) Notice: Subject to any disclaimer, the term of this patent is extended or adjusted under 35 U.S.C. 154(b) by 17 days.

(21) Appl. No.: 12/394,305

(22) Filed: Feb. 27, 2009

(65) Prior Publication Data

US 2010/0218423 A1 Sep. 2, 2010

(51) Int. Cl.
*A01G 31/00* (2006.01)
(52) U.S. Cl. ...................................... 47/62 A
(58) Field of Classification Search ............... 47/59 R, 47/62 A
See application file for complete search history.

(56) References Cited

U.S. PATENT DOCUMENTS

| | | | | |
|---|---|---|---|---|
| 2,855,725 | A * | 10/1958 | Carothers | 47/17 |
| 4,211,034 | A * | 7/1980 | Piesner | 47/62 E |
| 4,332,105 | A | 6/1982 | Nir | |
| 4,514,930 | A | 5/1985 | Schorr et al. | |
| 4,630,394 | A * | 12/1986 | Sherard | 47/59 R |
| 4,869,019 | A | 9/1989 | Ehrlich | |
| 5,394,647 | A | 3/1995 | Blackford, Jr. | |
| 5,502,923 | A | 4/1996 | Bradshaw | |
| 5,557,884 | A * | 9/1996 | Deppe | 47/62 E |
| 5,724,768 | A | 3/1998 | Ammann, Jr. | |
| 6,021,602 | A | 2/2000 | Orsi | |
| 6,219,966 | B1 * | 4/2001 | Lapointe et al. | 47/62 C |
| 6,314,676 | B1 * | 11/2001 | Tucker | 47/62 N |
| 6,574,917 | B2 * | 6/2003 | Boxsell | 47/62 C |
| 2007/0113472 | A1 | 5/2007 | Plowman | |

FOREIGN PATENT DOCUMENTS

| JP | 2009268443 A * | 11/2009 |
|---|---|---|
| KR | 757325 B1 * | 9/2007 |

* cited by examiner

*Primary Examiner*—Francis T Palo
(74) *Attorney, Agent, or Firm*—Charles S. Sara, Esq.; Dewitt Ross & Stevens S.C.

(57) ABSTRACT

An aeroponic plant growing system includes a water reservoir and growing chambers for growing plants in an aeroponic environment. A pump, a water distribution manifold, and water lines are used to provide water and nutrients from the water reservoir to sprayers in the growing chambers where the water and nutrients are sprayed on the roots of plants growing therein. The water distribution manifold and water lines preferably are provided as closed loop systems, such that water is provided to all sprayers despite a blockage in the manifold or a water line. Non-absorbed water and nutrients are returned to the water reservoir from the growing chambers on water return lines via a filter that includes multiple types of filter media, including filter media that support the colonization of organisms that support plant growth.

13 Claims, 6 Drawing Sheets

AEROPONIC PLANT GROWING SYSTEM

FIELD OF THE INVENTION

This invention is directed to an aeroponic system for growing plants.

BACKGROUND OF THE INVENTION

Aeroponics is the process of growing plants in an air or mist environment without the use of soil or an aggregate medium. Unlike hydroponics, which uses water as a growing medium, aeroponics is conducted without a growing medium. The basic principle of aeroponic growing is to grow plants in a closed or semi-closed environment by spraying the plant's roots with a nutrient rich solution. These conditions advance plant development, health, growth, flowering, and fruiting for any given plant species. Almost any plant can grow to maturity in air in an aeroponic environment with a plentiful supply of oxygen, water, and nutrients.

Aeroponic systems provide many desirable advantages over growing systems that employ a growing medium. In general, aeroponic systems are favored over other methods because the increased aeration of the nutrient solution delivers more oxygen to plant roots, stimulating growth and helping to prevent pathogen formation.

Aeroponics can limit disease transmission since plant-to-plant contact is reduced and each spray pulse can be sterile. Where soil, aggregate, or other growing media are used, disease can spread throughout the growing media, infecting many plants. Thus, in most greenhouses and other plant growing operations such solid growing media require sterilization after each crop and, in many cases, are simply discarded and replaced with fresh, certified sterile media for each new crop. A distinct advantage of aeroponic technology is that if a particular plant does become diseased, it can be quickly removed from the aeroponic plant growing system without disrupting or infecting the other plants. Due to the disease-free environment that is unique to aeroponics, many plants can grow at higher density (plants per square meter) when compared to more traditional forms of cultivation (hydroponics, soil, etc.). Commercial aeroponic systems incorporate hardware features that accommodate crops' expanding root systems.

Aeroponic growing is considered to be safe and ecologically friendly for producing natural, healthy plants, and crops. The main ecological advantages of aeroponics are the conservation of water and energy. When compared to hydroponics, aeroponics offers lower water and energy inputs per square meter of growing area.

Aeroponic systems can be used to support the growth of plants from seed germination or from cuttings. Aeroponic culturing has revolutionized cloning (propagation from cutting) of plants. Aeroponics allows the whole process of propagation from cuttings to be carried out in a single, automated unit. Numerous plants which were previously considered difficult, or impossible, to propagate from cuttings can now be replicated simply from a single stem cutting, because the aeroponic apparatus initiates faster and cleaner root development through use of a sterile, nutrient rich, highly oxygenated, and moist environment. With the use of aeroponics, growers have cloned and transplanted air-rooted plants directly into field soil. Aeroponic roots are not susceptible to wilting and leaf loss or loss due to transplant shock (a significant problem with hydroponics). Because of their healthiness, air-rooted plants are less likely to be infected with pathogens when placed in the field.

In an aeroponic system, the plant's root zone is suspended into an environment where the roots protrude into an atomized nutrient solution, with the leaves and crown, often called the "canopy," extending above. The roots of the plant are supported in the system by a plant support structure. Physical contact with the roots is minimized, so that the plant support structure does not hinder natural growth and root expansion or access to pure water, air exchange, and disease-free conditions. The lowest stem and root system are sprayed or misted for short durations with a hydro-atomized pure water and nutrient solution. In a true aeroponic apparatus the plant is totally suspended in air, giving the plant access to 100% of the available oxygen in the air. This maximizes the level of oxygen surrounding the stem and root system, accelerating and promoting root growth within the plant. While there is a constant available source of oxygen, the intermittent hydro-atomizing of a spray/mist of the water-nutrient solution provides the necessary moisture and essential minerals to keep plants alive and growing.

Aeroponic systems employ sprayers, misters, foggers, or other devices to create a fine mist of solution to deliver water and nutrients to plant roots. In commercial applications, a hydro-atomizing spray is employed to cover large areas of roots utilizing air pressure misting. A variation of the mist technique employs the use of ultrasonic nebulizers or foggers to mist nutrient solutions in low-pressure aeroponic devices. The key to root development in an aeroponic environment is the size of the water droplet. Water droplet size is crucial for sustaining aeroponic growth. Too large of a water droplet means less oxygen is available to the root system. Too fine of a water droplet produces excessive root hair without developing a lateral root system for sustained growth in an aeroponic system. Maintenance and the potential for component failure, such as degradation of the spray due to mineralization of mist heads, is a concern with aeroponic systems, as restricted access to water resulting from such a failure will cause aeroponically grown plants to wilt.

Various aeroponic plant growing systems have been commercially available. This includes both open systems, in which the water sprayed on the plant roots is not recycled, as well as closed systems, in which the water and nutrients sprayed on the plant roots are recovered back into a water reservoir, recycled, and reused. It is not uncommon for the spraying process in such known commercial aeroponic systems to be configured in an open loop fashion. By "open loop," it is meant that there is only one route for water to travel from the source to the sprayer. Such commercial systems are often controlled by a microprocessor. Examples of such commercially available systems include the following.

"AEROFLO" systems (General Hydroponics, Inc., Sebastopol, Calif.) provide an aeroponic plant growing system that features an internal "laser-drilled spray line," not individual sprayers. "AEROFLO" systems use gravity to drain the water reservoir, when needed. Each growing chamber in this system is fixedly attached to the next, limiting the ability to provide more growing space for plants as they grow larger and need more room for growth. Also, the growing chambers must be attached to the water reservoir. Because the growing chambers and reservoir cannot be separated, the water reservoir cannot be moved far from lights that are likely to be positioned above the growing chamber. This is a significant limitation for at least two reasons. Electricity is used to power the lights that are above the growing chambers. For safety purposes, electricity should be separated from the water in the reservoir as much as possible. Also, the growing lights are very hot and can heat the water in the reservoir, removing the water reservoir from beneath the lights helps to keep water temperatures down.

Aerojet systems (American Agritech, Tempe, Ariz.) provide an aeroponic plant growing system in which each growing chamber is fixedly attached to the next and in which the growing chambers are fixedly attached to the reservoir. This system features an internal manifold that requires that the entire system be shut down and torn apart to locate and fix a break in—or blockage of—the manifold. This system also relies on gravity alone to drain the water reservoir, when needed.

Aeroponic plant growing systems offered by Aero Machine (American Agritech), Apollo (Atlantis Hydroponics, Athens Ga.), Microgarden (American Agritech) and Turbogarden (American Agritech) also feature growing chambers that are fixedly attached to each other and/or fixedly attached to the water reservoir and have open sprayer line/manifold systems that are prone to fail after clogging. These systems also feature an inaccessible internal manifold and the use of gravity exclusively to drain the water reservoir.

NA Hydroponics (Granite Falls, Wash.) also offers an aeroponic system that has a built-in water reservoir and an inaccessible internal manifold.

Rainforest (General Hydroponics) offers an aeroponic system in which each growing chamber is fixedly attached to the next and which features an inaccessible internal manifold and the use of gravity alone to drain the water reservoir.

Aeroponic plant growing systems are also described in several published U.S. Patent documents, including the following.

U.S. Pat. No. 5,394,647 to Blackford, Jr. is directed to a self-contained hydroponic plant growing system. This system has a horizontal tubular chamber capped at each end and includes a series of holes along the top for supporting multiple flower pots or cups. The flower pots are suspended within the interior of the tubular chamber. The system also includes a water pump, a reservoir system, and a water delivery and spraying system. The water pump circulates water from the reservoir through spray tubes and out spray nozzles. The circulating water is absorbed by the roots of the plants hanging in the longitudinal tube. The water which is not absorbed by the plants falls onto a horizontal divider and drips through holes to the bottom of the tubular chamber. The excess water and nutrients flow through a recycle channel and back into the reservoir.

U.S. Pat. No. 5,502,923 to Bradshaw is directed to a hydroponic plant growth system which includes a circular plant module, a nutrient and water supply module, a water pump, and a water reservoir. Instead of a longitudinal tube-shaped growing chamber, the Bradshaw patent describes a circular module with the plants arranged around a center axis. Disposed along that center axis is the water and nutrient supply channel, which sprays water at the roots of the plants from a single nozzle. Non-absorbed water flows down to the lower water reservoir where it is available to be re-circulated by the water pump. An embodiment with several layers of plant modules also is described.

U.S. Pat. No. 5,724,768 to Ammann, Jr. is directed to an aeroponic plant growing system that also has a central axis, around which plants are situated. The central plant chamber includes a plurality of plant receiving apertures, which enter the central chamber perpendicularly to the central axis. Water is delivered from a sprayer located at the top of the central chamber. The water is sprayed downward and collected by the multiple perpendicularly-oriented plant holding apertures. Extra water flows down to a central reservoir at the bottom of the system.

U.S. Patent Application Publication No. 2007/0113472 to Plowman is directed to an aeroponic system for plant propagation including a plant holding chamber, a water and nutrient delivery system, and a cooling system. The chamber is a generally cube-like structure with a plurality of holes in the top layer, through which potted plants or baskets may be suspended. Within the chamber is a water delivery system with multiple spray nozzles directed toward the bottom of the pots or baskets. Within the bottom of the chamber is a water reservoir which collects the unabsorbed water. The reservoir is connected to a cooling system, which lowers the temperature of the circulating water. A water pump distributes the cooled water through the system and out of the spraying nozzles.

Although all of these systems provide for the aeroponic growing of plants with varying degrees of success, known aeroponic plant growing systems often suffer from many limitations. These include limitations in the ease or efficiency with which such known systems are operated and/or maintained, limitations in the reliability with which such systems are operated, limitations on the effectiveness with which plants may be grown in such systems, and limitations on system expandability. What is desired, therefore, is a new and improved aeroponic plant growing system that benefits from the many known advantages of growing plants in an aeroponic environment but which overcomes many of the limitations of existing aeroponic plant growing systems.

SUMMARY OF THE INVENTION

The present invention provides an improved aeroponic growing system, in which a combination of water, oxygen, and nutrients is provided directly at the root system of a plant. Plants grown in an aeroponic system in accordance with the present invention are not rooted in soil or other media and are not immersed in water; rather, their roots are gently sprayed with water and nutrients. Thus, an aeroponic plant growing system in accordance with the present invention provides for all of the known advantages of growing plants in an aeroponic environment, as described above.

An aeroponic plant growing system in accordance with the present invention features various functional components that are combined to provide various improvements over previously known aeroponic plant growing systems. A preferred aeroponic plant growing system in accordance with the present invention includes: a water reservoir, a filter including multiple types of filter media, a water distribution manifold, a pump to move water from the water reservoir and through the water distribution manifold to a plurality of water lines, a plurality of growing chambers adapted to support plants to be grown therein, a series of water sprayers connected to the water lines and positioned in the growing chambers for directing water onto the roots of plants placed in the growing chambers, and drain lines connecting the growing chambers to the water reservoir via the filter. The plurality of growing chambers may be supported on a growing chamber support table.

An aeroponic plant growing system in accordance with the present invention provides an improvement over previously known systems in plant growing effectiveness and efficiency and in operational use, reliability, and maintenance. This improvement is achieved both by how the individual functional components of an aeroponic system in accordance with the present invention are implemented and how these various components are combined.

The water reservoir of an aeroponic plant growing system in accordance with the present invention preferably is implemented as a plastic container with a removable lid. The water reservoir lid preferably has a variety of apertures formed therein. These apertures support air lines, support probes for monitoring devices used to monitor the condition of the water in the water reservoir, provide for a system pump located within the reservoir or for pump lines (for a system pump located outside of the reservoir), and support the ends of the drain lines.

The filter of an aeroponic plant growing system in accordance with the present invention preferably is implemented as a filter system positioned within the water reservoir such that water returning to the water reservoir on the drain lines passes through the filter system before being re-combined with the water in the reservoir. The filter system may include a plurality of filter trays containing different types of filter media. The filter trays may be positioned in a support structure that is mounted to an under side of a hinged portion of the water reservoir lid, such that the filter system may be accessed easily for inspection and removal of the filter trays, when needed. The various types of filter media in the filter trays are selected to perform various functions, such as to filter particles of various sizes from the water in the system, to add trace elements to the water to support plant growth, and to support the colonization of living organisms, such as bacteria and fungi. The presence of such organisms enhances the growth of plants in the system, but is not supported by conventional aeroponic growing systems.

In accordance with the present invention, the water distribution manifold preferably is implemented as a modular component that is readily accessible. Thus, blockages or other problems with the manifold are more easily detected, and the manifold is more easily cleaned and/or fixed when necessary without tearing down the system or, in most cases, without even shutting down system operation. Preferably, the water distribution manifold is formed from one or more manifold tubes that preferably are 1¼ inch in diameter or larger. If the manifold tubes are too small, there is the risk of uneven nutrient distribution within the system. In an aeroponic plant growing system in accordance with the present invention having manifold tubes of the preferred size, proper nutrient distribution will not be a concern.

In accordance with the present invention, the water distribution manifold preferably is implemented as a closed loop system, wherein there is more than one path through the manifold from the point where water from the water reservoir is pumped into the manifold by the pump and each of a plurality of water lines connected to the water distribution manifold. Thus, even if the water distribution manifold is entirely blocked at one point therein, water will continue to be provided by all of the water lines to plants in the growing chambers via alternative paths through the manifold.

The pump is coupled to the water distribution manifold and to the water reservoir to deliver water from the reservoir to the various water supply lines and water sprayers via the water distribution manifold. In accordance with the present invention, the pump also may be used for rapid emptying of the water reservoir, when needed. For this purpose a valve may be provided on the water distribution manifold and coupled to a system drain line or hose. In normal operation the valve is closed, and water is pumped through the water distribution manifold for distribution to the water sprayers via the water supply lines. When it is desired to drain the water reservoir, the valve is opened, and the pump is operated to pump water from the reservoir to the system drain line via the manifold valve. In this manner, an aeroponic plant growing system in accordance with the present invention allows the water reservoir to be drained quickly using the system pump. Thus, overall system shutdown time is reduced when the reservoir needs to be drained, in comparison with systems that employ only gravity to drain the system water reservoir.

Flexible water supply lines are run from the water distribution manifold into each growing chamber. The diameter of the water distribution manifold and of the water lines attached thereto is selected such that the water distribution manifold diameter preferably is larger than the water line diameter. This ratio ensures that the proper pressure is achieved in the water lines for creating a fine mist from the sprayers, while allowing the water/nutrient solution to be pushed further and for more sprayers to operate without increasing the energy output required from the pump.

Each growing chamber in an aeroponic growing system in accordance with the present invention may be implemented as a tubular structure formed of a plastic material. A series of plant apertures are formed separately from each other in a line along a top side of the growing chamber tube. The plant apertures are adapted to support plant baskets or other structures for supporting plants in the plant apertures. The ends of the growing chamber tubes preferably are capped with removable caps. For example, the ends of the growing chamber tubes may be threaded, with threaded end-caps provided for removable mounting on the ends of the tubes. Providing removable end caps in this manner provides for at least two advantages. First, one or both of the end-caps may be removed to allow easy access to the interior of the growing chamber from either end to provide for easier maintenance within the chamber. Second, the length of a growing chamber may be extended easily by removing an end-cap and attaching a growing chamber extension, in the same form as the extant growing chamber, onto the end of the growing chamber. The growing chamber extension may be attached by threading onto the threaded end of the extant growing chamber by using an appropriate coupling structure, etc. A plurality of growing chambers, with or without extensions, may be supported on a growing chamber support table that is designed to support a varying number of growing chambers separated from each other by varying distances.

The water sprayers are attached to the water supply lines in the growing chambers at positions thereon such that sprays of water and nutrients are directed onto the roots of plants positioned in each of the plant apertures of the growing chambers from at least two individual sprayers when provided under pressure thereto by operation of the pump. Each water supply line section to which the sprayers are attached preferably is implemented as a closed loop, such that water is provided under pressure to each of the sprayers on the water line section via at least two paths. By connecting the water supply lines in this manner, a single blockage of any water supply line section in the growing chamber will not prevent water and nutrients from being delivered by all the water sprayers on that section of water line.

The water sprayers attached to the water supply lines preferably are implemented as individual sprayer nozzles that are easily individually removed for cleaning and or replacement if they become blocked or damaged. In accordance with the present invention, such maintenance typically may be accomplished without shutting down operation of the system as a whole by temporarily removing a single water line from the growing chamber so that the sprayer to be removed and replaced may be accessed.

At least one drain aperture is formed in each growing chamber, preferably in a bottom side thereof, opposite to the side in which the plant apertures are formed. The drain lines are run from the drain apertures of the growing chambers back to the water reservoir to recycle water and nutrients that are not absorbed by the plant roots and drip from the plant roots to the bottom of the growing chamber. The drain lines are connected to the water reservoir such that water returned to the reservoir on the drain lines passes through the system filter before being re-combined with water in the reservoir. The drain lines preferably are formed using flexible and/or easily moveable and adjustable tubing.

The use of independent modular growing chambers and flexible, moveable, and/or extensible water supply and drain lines provides several advantages for an aeroponic growing system in accordance with the present invention over known commercially available systems in which the growing chambers and water reservoir are attached together in a unitary structure. As plants grow they may need more space and may need to be moved apart to provide more growing room. In accordance with the present invention, this can be achieved by simply moving one or more of the independent growing chambers on the growing chamber table to achieve the desired spacing between them, extending the flexible water supply lines and drain lines as necessary. This operation may be performed at any time, even without shutting down system operation. Furthermore, since the water reservoir is not fixedly attached to the growing chambers, the reservoir and water distribution manifold may be placed near a water source and separated further away from the growing chambers. Electricity is used to power growing lights that often are positioned above the growing chambers. The ability to separate this electricity source from the water in the reservoir as much as possible provides a very important measure of safety. Also, the growing lights can be very hot and can heat the water in the reservoir if it is placed too near the lights. Removing the water reservoir from the lights helps to keep water temperatures down.

Further objects, features, and advantages of the invention will appear more fully from the following detailed description of preferred embodiments of the invention made in conjunction with the accompanying drawings.

DETAILED DESCRIPTION OF THE INVENTION

An exemplary aeroponic plant growing system 20 in accordance with the present invention will now be described in detail beginning with the schematic illustration of the main functional components of the system 20 as presented in FIG. 1. It should be understood that an aeroponic plant growing system in accordance with the present invention may be formed in any desired size depending on space available, the type and quantity of plants to be grown in the system, etc. The exemplary system in accordance with the present invention to be described in detail herein takes approximately 6×6 feet of floor space for operation (an approximately 8×8 foot space would be needed to allow an operator to walk all the way around the system while in operation). An aeroponic plant growing system in accordance with the present invention may be larger or smaller than—and may have different relative width and length dimensions from—the exemplary system described by example herein.

The main components of an aeroponic plant growing system 20 in accordance with the present invention include a water reservoir 22, a water distribution manifold 24, a plurality of growing chambers 26, a pump 28 for delivering water and nutrients to the growing chambers 26 via the water distribution manifold 24 and a plurality of water distribution lines 30, a filter 32 including a plurality of different types of filter media, and drain lines 34 for returning water and nutrients from the growing chambers 26 to the water reservoir 22 via the filter 32 for recycling and reusing.

In operation of the system 20, water and nutrients are contained in the water reservoir 22. The pump 28 is operated, via a manual or automatic controller 36, to deliver water and nutrients from the water reservoir 22, via the water distribution manifold 24 and water distribution lines 30, to sprayers located in the growing chambers 26, wherein the water and nutrients are sprayed directly onto the roots of plants supported in plant apertures 38 formed in the growing chambers 26. Excess water and nutrients that are not absorbed by the plants in the growing chambers 26 are collected via the drain lines 34 and returned to the water reservoir 22 via the filter 32 for recycling and reuse. Exemplary embodiments of each of these components now will be described in more detail, along with additional components of an exemplary aeroponic plant growing system 20 in accordance with the present invention.

The water reservoir 22 may be implemented using any appropriate container made of any appropriate material. A water reservoir 22 made of plastic is preferred. The water reservoir 22 preferably should be large enough to contain a sufficient quantity of water such that the water reservoir 22 does not need to be refilled too often, thereby saving time and labor. The preferred size of the water reservoir will depend on various factors, including the number of plants to be grown in the system 20, the type of plants, growing conditions, the space available, etc. For the exemplary embodiment being described, the reservoir 22 is implemented as a 70 gallon Canadian brand plastic water reservoir with a removable lid and slanted corners. The removable lid prevents debris from falling into the reservoir while allowing access to the interior of the reservoir when needed, e.g., to perform maintenance, for cleaning, or for other purposes.

Figure 2:
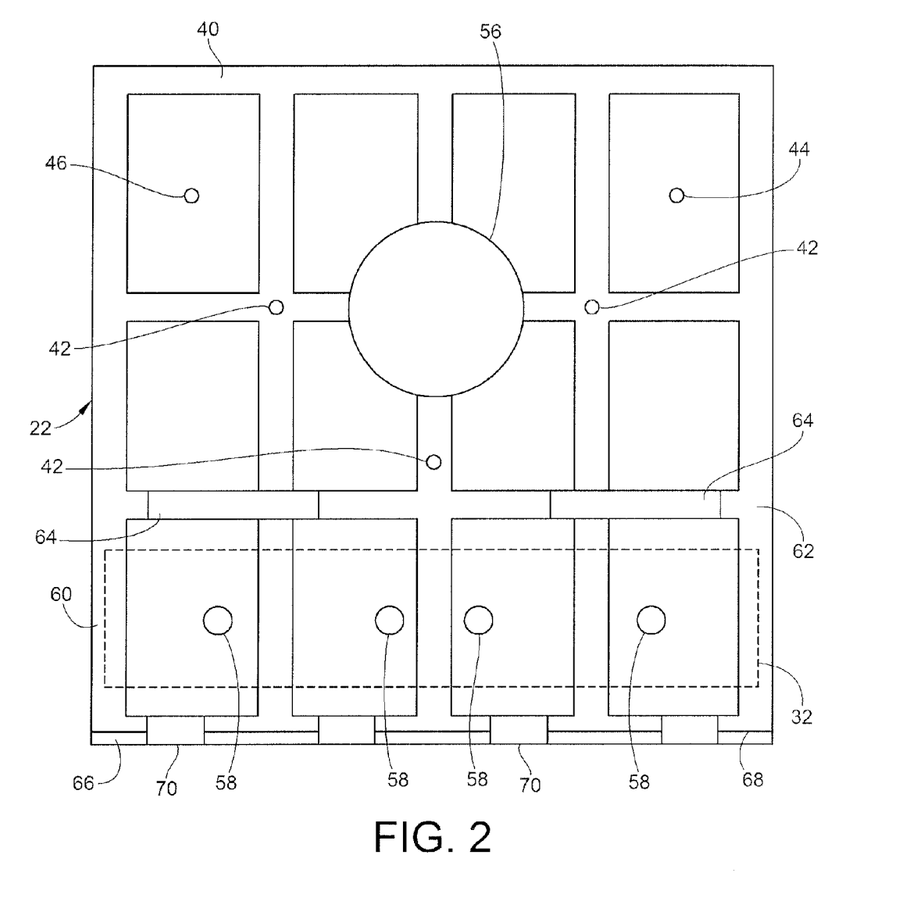
FIG. 2 is a top plan view of an exemplary water reservoir for use in an aeroponic plant growing system in accordance with the present invention, showing the lid thereof.

A top view of the exemplary water reservoir 22, showing the lid 40 thereof, is illustrated in FIG. 2. The lid 40 of the water reservoir 22 has various apertures formed therein for a variety of purposes. For example, a plurality of apertures 42, e.g., 1-inch diameter circular apertures, are formed in the lid 40 to support air lines. More or fewer air line apertures 42 of various similar or different sizes and shapes may be formed in the lid 40 as desired. The air line apertures 42 support air lines (not shown) that feed air stones positioned within the water reservoir 22 to add dissolved air to the nutrient solution therein. The air stones also provide circulation of the nutrient solution and a mixing effect. By circulating the nutrient solution in the reservoir 22, nutrients are prevented from settling out of the water, which would render the nutrients unavailable to plants.

A plurality of apertures 44 and 46, e.g., 1-inch diameter circular apertures, also may be formed in the lid 40 to provide access for various probes 48 and 50 (see FIG. 1), respectively, for monitoring devices that monitor the condition of the water in the reservoir 22. Such monitoring devices may include pH monitors 52 to monitor the pH of the nutrient solution in the reservoir 22 and electrical conductivity (EC) monitors 54 to assess the amount of nutrient within the nutrient solution (for example, reading is provided in parts per million (ppm)). The output of the monitoring devices 52 and 54 may be monitored manually, for manual system control, or provided to a microprocessor based controller 36, for more automatic control of the system. (Varying degrees of automated control may be provided by the system controller 36, as will be known to those skilled in the art.) For example, the pH monitor 52 may be part of an automated pH control system. Such an automated pH control system monitors the current pH of the fluid in the water reservoir 22 and adjusts the pH to within a selected desired range by adding an appropriate base or acid material to the fluid, whichever is needed. Maintaining the proper pH is an ongoing frequent activity that is best performed by such an automated system that will not over- or under-shoot the desired pH range. Anytime the pH range is adjusted too quickly or by too much, the result may be death to the plants growing in the system 20.

More or fewer probe apertures 44 and 46 of various similar or different sizes and shapes may be formed in the lid 40, as desired, to provide access for probes for more, fewer, or different monitoring devices. For example, an inline total dissolved solids (TDS) meter may also or alternatively be used to measure the amount of nutrient within the nutrient solution (in ppm). Some nutrients do not affect the EC but are registered by the TDS meter, and vice versa, so a combination of the two is required for accurate nutrient measurements. A thermometer also may be used to assess the temperature of the nutrient solution within the reservoir 22.

A larger aperture 56, e.g., a 6-inch diameter circular aperture, is formed in the lid 40 for the pump 28, which may be positioned within the reservoir 22. Alternatively, this aperture 56 may be replaced by an aperture of a different size or shape so as to support a pump output line extending from a pump 28 positioned in the reservoir 22 to the water distribution manifold 24 or to support a pump input line for pulling water from the reservoir 22 for a pump 28 located outside of the reservoir.

A plurality of drain line apertures 58, e.g., 2-inch diameter circular apertures, are formed in the lid 40 to support ends of the drain lines 34. More or fewer drain line apertures 58 having similar or different sizes and shapes from those illustrated and described herein may be used, depending upon how the drain lines 34 are implemented and how many are employed in a given aeroponic growing system 20 in accordance with the present invention. The drain line apertures 58 are positioned in the lid 40 above the position of the filter 32 (shown in broken lines in FIG. 2) within the reservoir 22. Thus, water and nutrients returning from the growing chambers 26 via the drain lines 34 are directed onto the top of the filter 32 and flow through the filter 32 before being recombined with the water in the reservoir 22.

The filter 32 preferably may be implemented as a filter system 32 that is mounted to a hinged portion 60 of the lid 40 to provide easy access thereto. Thus, the drain line apertures 58 preferably are formed in the hinged portion 60 of the lid 40. The hinged portion 60 of the lid 40 may be formed by cutting 62 across the lid 40 at the desired location to separate the hinged portion 60 of the lid 40 from the rest of the lid 40. Hinges 64 are then formed or mounted across this cut 62 to attach the hinged portion 60 of the lid 40 to the rest of the lid 40 in a hinged relation with respect thereto. Any appropriate hinges 64 may be used, depending upon the material from which the reservoir lid 40 is made. In the exemplary case being discussed, the hinges 64 may be formed of plastic, such as black acrylonitrile butadiene styrene (ABS) plastic.

A hinged lip 66 may be formed across the front of the hinged portion 60 of the lid 40, i.e., along the side of the hinged portion 60 opposite the hinges 64. The hinged lip 66 may be formed by cutting 68 across the hinged portion 60 near the front thereof but back from any downward extending portion at the peripheral edge of the lid 40. Hinges 70 are then formed or mounted across this cut 68 to attach the hinged lip 66 to the rest of the hinged portion 60 of the lid in a hinged relation with respect thereto. Any appropriate hinges 70 may be used, depending upon the material from which the reservoir lid 40 is made. In the exemplary case being discussed, the hinges 70 may be formed of black plastic (ABS).

Figure 3:
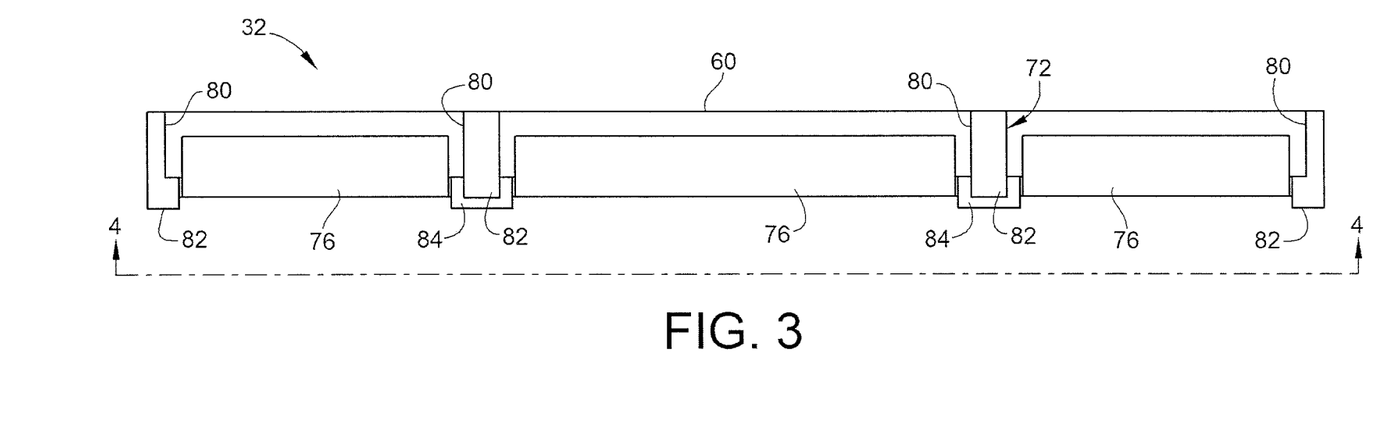
FIG. 3 is a front side view of an exemplary filter case support structure attached to a water reservoir of an aeroponic plant growing system in accordance with the present invention and having filter trays supported therein.
Figure 4:
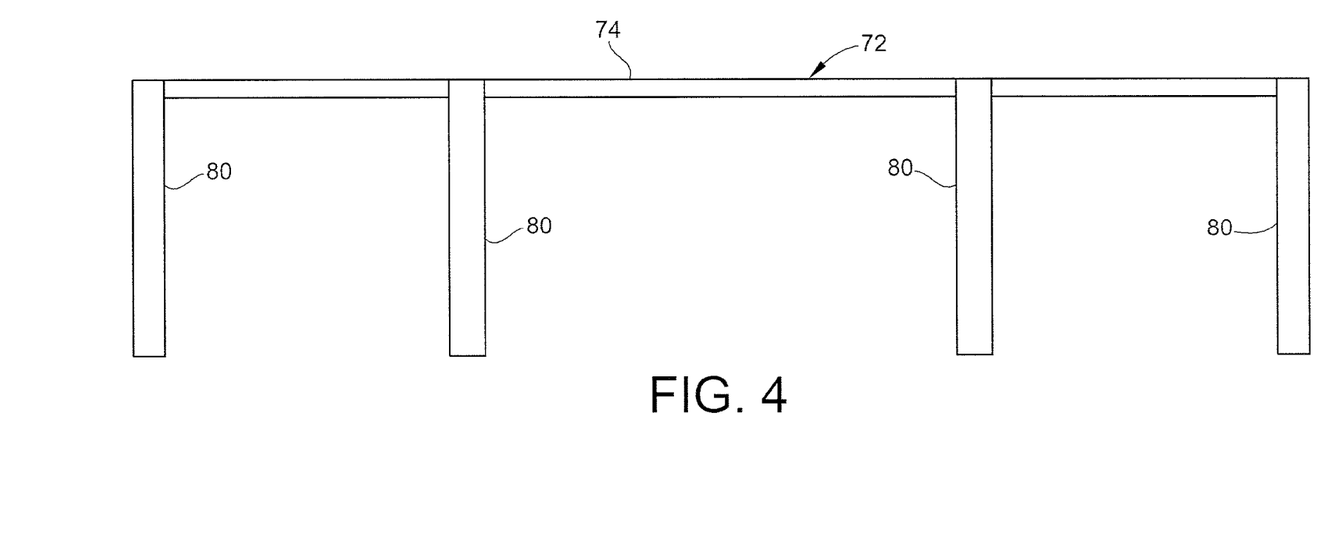
FIG. 4 is a bottom plan view of the exemplary filter case support structure of FIG. 3 with the filter trays removed, as taken along line 4-4 of FIG. 3.

The filter system 32 preferably may be mounted to the underside of the hinged portion 60 of the lid 40, i.e., on the side thereof that is on the interior of the reservoir 22 when the hinged portion 60 is closed about the hinges 64, via a filter case support structure 72, as illustrated in FIGS. 3 and 4. The filter case support structure 72 is formed of a plurality of elongated vertical members that are attached along the top or proximal side thereof to the underside of the hinged portion 60 of the lid 40 and which form a frame that is open at the front end thereof, i.e., open on the side of the support structure frame 72 that faces the hinged lip 66. Elongated back vertical members 74 are attached to the underside of the hinged portion 60 toward the back of the hinged portion 60, e.g., near the hinges 64, and extend parallel with the back edge of the hinged portion 60, i.e., parallel with the cut 62. These elongated back members 74 form the back of the case support structure frame 72, and form a back-stop for the filter trays 76 to be supported in the filter case support structure 72. Elongated side vertical members 80 are attached to the underside of the hinged portion 60 and extend perpendicularly forward from the back members 74 to define between them a plurality of frame sections for containing the filter trays 76. Horizontal members 82 are formed or attached at the bottom or distal ends of the side vertical members 80 and extend horizontally outward therefrom along the length of the bottom or distal ends of the side vertical members 80. Horizontal slots 84 are formed along the horizontal members 82 such that horizontal slots 84 face each other across the open frame sections formed by the vertical back 74 and side 80 members.

Figure 5:
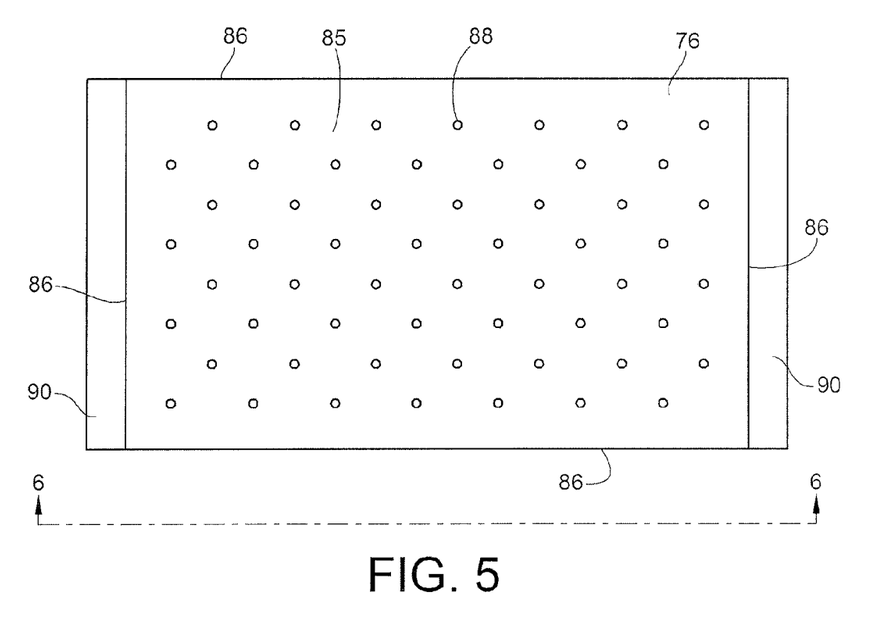
FIG. 5 is a top plan view of an exemplary filter tray for use in an aeroponic plant growing system in accordance with the present invention.
Figure 6:
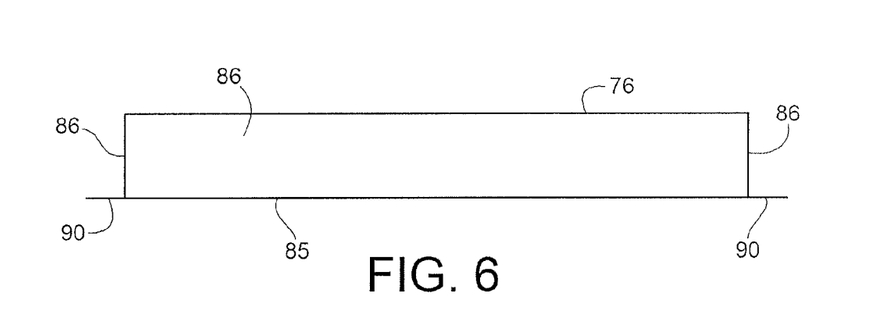
FIG. 6 is a front side view of the exemplary filter tray of FIG. 5, as taken along the line 6-6 of FIG. 5.

As illustrated in FIGS. 5 and 6, each filter tray 76 is formed as a square or rectangular open topped box-like structure having a bottom 85 and four side walls 86. In the exemplary embodiment being described, the side walls 86 are approximately 2 inches high, although it should be understood that the side walls 86 may be of any other appropriate height. The bottom 85 of the filter tray 76 between the side walls 86 has a plurality of drain holes 88 formed therethrough. The drain holes 88 are sized to let water pass through without allowing a filter medium contained in the filter tray 76 to pass through. The bottom 85 of the tray 76 is formed to extend beyond the walls 86 of the tray 76 on two opposite sides thereof. (The bottom 85 of the tray 76 preferably does not extend beyond the walls 86 of the tray on the other two sides thereof.) Thus, the bottom 85 of the tray 76 includes extending portions 90 on opposite side thereof. Each tray 76 is sized such that the extending portions 90 of the tray 76 slide into the opposed horizontal slots 84 on the horizontal members 82 of the filter case support structure 72. (As illustrated in FIG. 3, the filter case support structure 72 may be formed to support a plurality of different sized trays 76, or may be formed to support a plurality of the same sized trays 76.)

The filter case support structure 72 and the filter trays 76 may be made of any appropriate material, and may be made of the same or different materials, using any appropriate manufacturing techniques. The filter case support structure 72 may be attached to the under side of the hinged portion 60 of the lid 40 in any appropriate manner, e.g., using appropriate fasteners and/or adhesives. In the exemplary embodiment being described herein, the filter case support structure 72 and the trays 76 are made of the same material as the reservoir lid (ABS type plastic). In this case, the filter case support structure 72 is attached to the hinged portion 60 of the lid 40 using an appropriate adhesive. Since the filter case 72 and the lid 40 are made of the same material, proper chemical bonding can take place readily.

In operation, the plurality of filter trays 76 contain filter media. As will be discussed in more detail below, different types of filter media preferably are contained in the various filter trays 76 that are used. The filter media are placed into the filter trays 76 before the filter trays 76 are positioned in the filter case support structure 72. The filter media preferably only partially fill the filter trays 76, thereby leaving an air space between the top of the filter medium in the tray 76 and the bottom surface of the hinged portion 60 of the lid 40 when the filter tray 76 is positioned in the filter case support structure 72. For example, for filter trays 76 having 2-inch side walls 86, the filter media preferably may be filled to a depth of approximately 1 inch in the filter tray 76, leaving an air space of approximately 1 inch from the top of the filter medium in the tray to the under side of the hinged portion 60 of the lid 40. The air space above the filter medium is important to insure that helpful organisms growing in the filter medium are able to thrive. Without the air space, such helpful organisms could not survive.

To position the filter trays 76 loaded with the filter media in the system 20, the hinged portion 60 of the lid 40 is first opened about the hinges 64. The front lip 66 is then opened about the hinges 70, thereby exposing the filter case support structure 72. Each filter tray 76 then is positioned in the filter case 72 by inserting the extending portions 90 of the filter tray bottom 85 into the opposed slots 84 formed in the horizontal members 82 at the bottoms of the vertical side members 80 of the filter case support structure 72. The trays 76 are pushed backward in the slots 84 until they contact the vertical back member 74, which forms a back-stop for the trays 76. The front lip 66 is then closed about the hinges 70, and the hinged portion 60 of the lid 40 is closed about the hinges 64. The ends of the drain lines 34 may then be positioned in the drain line apertures 58 formed in the hinged portion 60 of the lid 40, such that water and nutrients returned on the drain lines 34 from the growing chambers 26 pass through the filter media in the filter trays 76 before being combined with the water in the water reservoir 22. (It should be noted that the initial water level in the reservoir 22 should be such that the water in the reservoir 22 does not contact the filter trays 76. Thus, the filter system 32 effectively suspends the filter media above the water in the reservoir 22.) This process is reversed whenever the filter trays 76 need to be removed, e.g., for inspection, cleaning, and/or replacement of the filter media in the filter trays 76.

Many of the plants to be grown in an aeroponic plant growing system in accordance with the present invention normally would be grown in soil. One advantage of growing plants in soil is the presence of soil dwelling organisms that enhance plant growth, generally by aiding in the development of the plant's root system. Such soil dwelling organisms as bacteria (*Bacillus subtilis*) and Mycorrhizae fungi (*Trichoderma*) are extremely beneficial in aiding a plant with nutrient uptake as well as providing natural disease control. These organisms are in some cases (Mycorrhizae) attached directly to the root system of the plant, aiding in its development. An aeroponic plant growing system in accordance with the present invention makes use of such organisms by providing a colonization area in the filter system 32 wherein a healthy population of such organisms can be maintained. Thus, in accordance with the present invention, a variety of filter media are provided in the filter system 32, including organic filter media in which the desired organisms can grow and thrive. These helpful organisms then are washed into the water in the water reservoir 22 for distribution to the plants in the growing chambers 26 each time water is returned from the growing chambers 26 though the filter system 32.

In accordance with the present invention, at least two different types of filter media are employed in the filter system 32, wherein at least one of these types of filter media supports growth of desired plant growth enhancing organisms. These organisms will also feed on each other, so it is important to have various separate colonies. If all of the organisms were to colonize together, the balance would be thrown off, and eventually one organism (e.g., *Trichoderma*) would remain. The resulting toxins from the dead bacteria would pollute the water/nutrient solution (without bacteria to breakdown the waste material into something more useful to the plant). In accordance with the present invention, such separate colonies are supported by the filter media provided in separate filter trays 76 of the filter system 32.

Examples of filter media that may be used in an aeroponic growing system in accordance with the present invention include:

Crushed coral. Crushed coral adds trace elements of calcium and magnesium to the water.

Activated carbon. Activated carbon helps clean the water as well as reducing odors. Activated carbon also is very porous, which aids in bacterial colonization. Crushed coral and activated carbon may be combined in a single filter tray or provided separately in separate filter trays.

Bioballs. Bioballs are structures designed to have a large surface area for the colonization of useful organisms, such as bacteria. An example of commercially available bioballs is the "Nano Balls"-brand bioballs (Current-USA, Inc., Vista, Calif.).

Natural fiber materials, such as coco fiber and hog hair fiber. This type of filter is used for screening large debris. Natural fiber materials also are useful for cultivating microbacteria and other beneficial organisms.

Polyfil. Used for screening smaller debris particles that may pass through other filters in the system.

Lava stone. Lava stone is porous material useful for bacterial colonization.

Wood chips. Wood chips also provide a suitable medium for the colonization of helpful organisms.

The specific different types of filter media to be used in the filter system 32 may be selected to suit specific desired growing conditions.

In the exemplary embodiment of an aeroponic growing system 20 in accordance with the present invention as described herein, a multiple stage filter is provided by different types of filter media placed side by side in the filter system 32, with different drain lines 34 returning water and nutrients from the various growing chambers 36 in the system 20 through the different types of filter media and back into the water reservoir 22. However, it should be understood that a multiple stage filter of this type for use in an aeroponic growing system in accordance with the present invention may be formed with the different types of filter media stacked on top of one another, e.g., in a series of stacked filter trays. In such a configuration, water and nutrients returned from one or more growing chambers 26 are directed from one or more drain lines 34 to the topmost filter in the system, with the returned water then passing though the different types of filter media in sequence. A hybrid or combined side-by-side/stacked filter system also may be used.

Returning to FIG. 1 and as mentioned above, the pump 28 may be positioned in the water reservoir 22, e.g., at the location of the pump aperture 56 in the reservoir lid 40. In this configuration, a lift tube 92 carries water from the pump 28 upward to the water distribution manifold 24, which may be positioned immediately above the water reservoir 20 and may rest on the reservoir lid 40 for support. In the exemplary embodiment being described, the pump 28 may be implemented as a ½ horsepower "FLOTEC" (Sta-Rite, LLC, Delavan, Wis.) automatic submersible pump, with a pumping capability of 3,630 gallons per hour. The lift tube 92 may be implemented as a 1 foot long section of 1¼ inch schedule 40 polyvinyl chloride (Sc40PVC) tube with a 1¼ inch Sc40PVC male adapter cemented on the bottom and a 1¼ inch Sc40PVC female adapter cemented to the top. The bottom of the lift tube 92 may be threaded into the 1¼ inch female output port of the pump 28.

It should be understood that other types of pumps 28 and lift tubes 92 may be used in an aeroponic plant growing system 20 in accordance with the present invention. This may include pumps 28 that are positioned within the water reservoir 22 as well as pumps 28 that are positioned outside the water reservoir 22. For pumps 28 that are located outside the water reservoir 22, an appropriate pump input or suction line is run from the reservoir 22 to the pump 28, whereby water is drawn from the reservoir 22. An appropriate lift tube 92 or other conduit is then run from the output of the pump 28 located outside of the reservoir 22 to the water distribution manifold 24. Multiple pumps 28 also may be employed. The capacity and/or number of pumps 28 to be used may be selected based upon such factors as the size of the aeroponic plant growing system 20 in accordance with the present invention, the quantity and type of plants growing in the system 20, growing conditions, etc.

Figure 7:
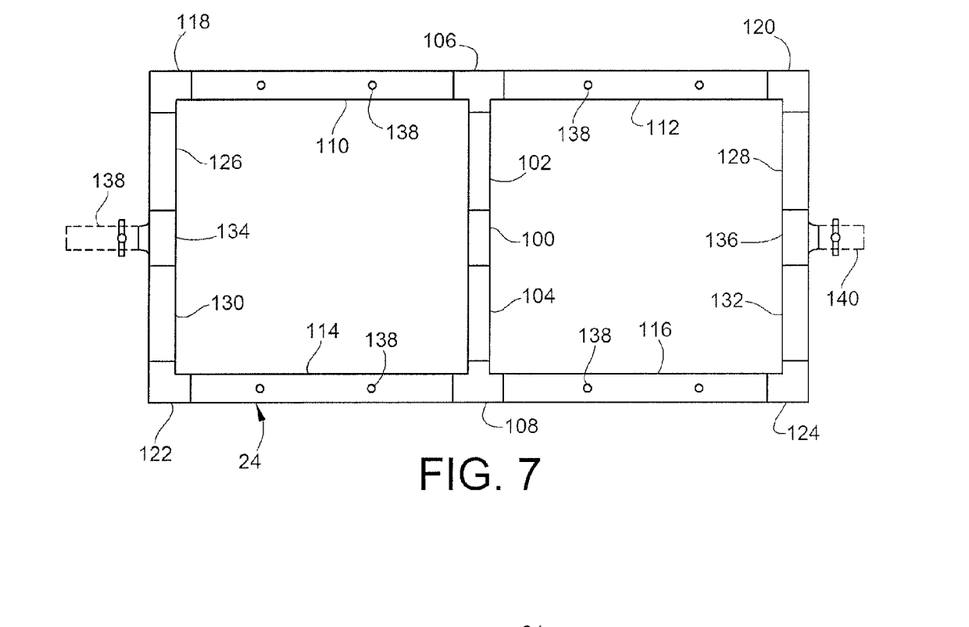
FIG. 7 is a top plan view of an exemplary water distribution manifold for use in an aeroponic plant growing system in accordance with the present invention.
Figure 8:
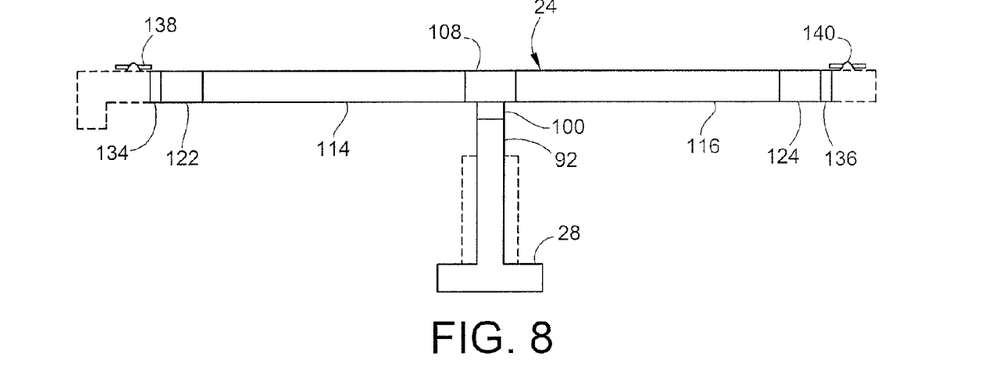
FIG. 8 is a side view of the exemplary water distribution manifold of FIG. 7.

An exemplary water distribution manifold 24 for use in an aeroponic growing system 20 in accordance with the present invention now will be described in detail with reference to FIGS. 7 and 8. The exemplary manifold 24 is formed of sections of 1¼ inch Sc40PVC tube. The manifold 24 is attached in fluid communication to the lift tube 92 from the pump 28 with a 1¼ inch Sc40PVC T-coupler 100. The T-coupler 100 has a section (e.g., a three-inch long section) of 1¼ inch Sc40PVC tube cemented to the bottom. Cemented to the other end of this section of Sc40PVC tube is a 1¼ inch Sc40PVC male adapter for connection to the lift tube 92. Two sections 102 and 104 (e.g., 8 inch sections) of 1¼ inch Sc40PVC tube are then cemented into the remaining ports of the T-coupler 100, one section 102 or 104 on each side thereof. A 1¼ inch Sc40PVC T-coupler 106, 108 is cemented to each of the tube sections 102 and 104, respectively, at the ends thereof opposite the T-coupler 100. The T-coupler 100, tube sections 102 and 104, and T-couplers 106 and 108 together form a central section of the water distribution manifold 24. Two elongated sections 110, 112 and 114, 116 (e.g., 20 inch long sections) of 1¼ inch Sc40PVC tube are cemented into each of the T-couplers 106 and 108, respectively, so as to extend perpendicular to the central tube sections 102 and 104, with the elongated sections 110, 112 and 114, 116 being disposed in the same plane. A 1¼ inch Sc40PVC 90 degree elbow 118, 120, 122, and 124 is cemented to each of the elongated tube sections 110, 112, 114, and 116, respectively, at the ends thereof opposite the T-couplers 106 and 108. The combined T-couplers, elongated tube sections, and elbows 106, 110, 112, 118, and 120 and 108, 114, 116, 122, and 124 form two longer elongated side sections of the water distribution manifold 24. Sections 126, 128, 130, and 132 (e.g., 8 inch long sections) of 1¼ inch Sc40PVC tube are cemented into the other ends of the elbows 118, 120, 122, and 124, respectively, such that the tube sections 126, 128, 130 and 132 extend parallel with the central tube sections 102 and 104. The tube section pairs 126, 130 and 128, 132 are connected together by cementing a 1¼ inch Sc40PVC T-coupler 134 or 136, respectively, at the ends of the tube sections 126, 130 and 128, 132 opposite the elbows 118, 124, and 120, 124. Thus, the elbows, tube sections, and T-couplers 118, 126, 134, 130, and 122 and 120, 128, 136, 132, and 124 form two shorter elongated sides of the water distribution manifold 24. A valve 138, 140, such as a 1¼ inch Sc40PVC ball-valve, is cemented to the remaining end of the T-couplers 134 and 136, respectively. This completes the framework of the exemplary water distribution manifold 24.

One of the valves 138 may be used to get water from water reservoir 22 when needed. For example, with the valve 138 open and the pump 28 in operation, water may be pumped from the water reservoir 22 into a watering can, so that the nutrient rich water from the reservoir 22 may be used to water plants being grown outside the system 20.

Figure 1:
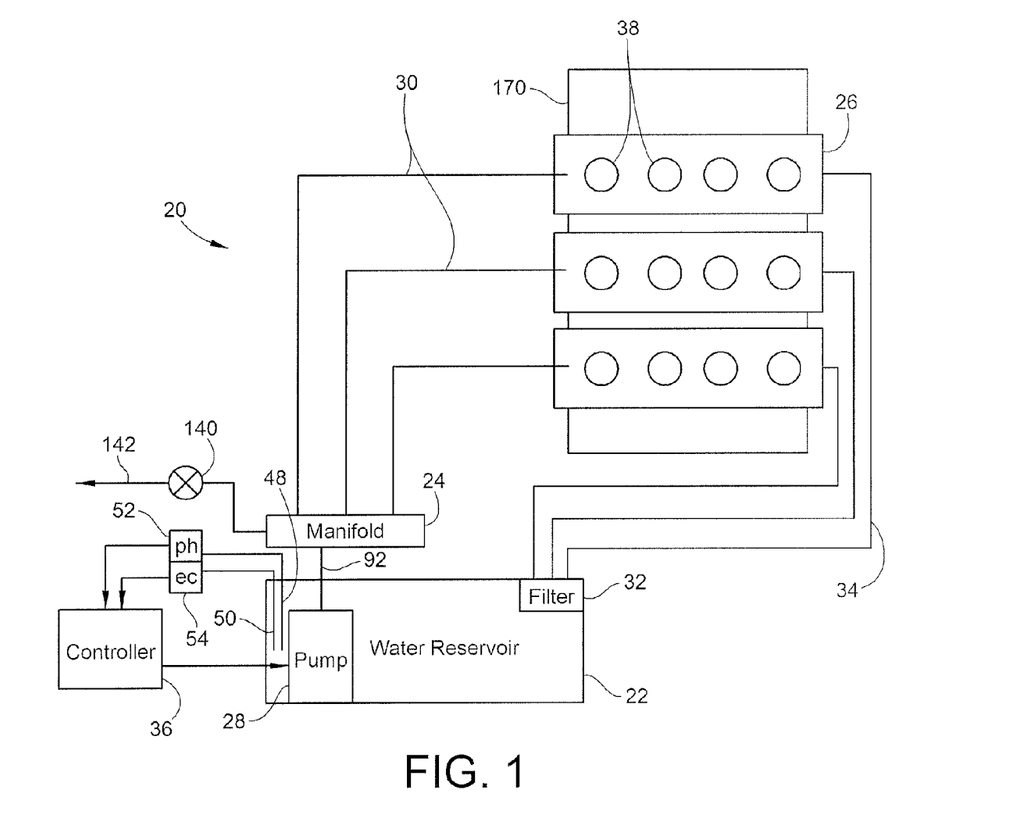
FIG. 1 is a schematic illustration of the main functional components of an exemplary aeroponic plant growing system in accordance with the present invention.

Another of the valves 140 may be coupled to a system drain line 142 (see FIG. 1). To drain quickly the water reservoir 22, when needed, this system drain valve 140 is opened, and the pump 28 is operated to pump quickly the water out of the reservoir 22. Thus, an aeroponic plant growing system 20 in accordance with the present invention provides for much more rapid draining of the water reservoir 22 than is possible with other systems that rely solely on gravity to drain the water reservoir. This allows for more rapid turn-around time and thus less system down time when draining of the water reservoir 22 is required. (It should be noted that, when water changes are needed, it is preferable not to drain the water reservoir 22 entirely. A certain amount of water preferably is allowed to remain in the reservoir 22, as this water may be rich in useful organisms, and allowing this water to remain in the system will provide a jump start in reestablishing active colonization of such organisms in the system 20.)

The elongated tube sections 110, 112, 114 and 116 of the water distribution manifold 24 each have a plurality of water line apertures 138 formed therein. The water line apertures 138 extend entirely through the tube wall and preferably are evenly spaced along the tube sections 110, 112, 114, and 116. Each water line aperture 138 is adapted to support a connection to one end of a water line 30 for carrying water from the water distribution manifold 24 to a growing chamber 26. For example, a total of eight ⅜ inch holes may be drilled into the tube sections 110, 112, 114, and 116 to form eight water line apertures 138. An appropriate connector or coupling device preferably is positioned in each water line aperture 138 to facilitate connection of the water lines 30 to the water distribution manifold 24. For example, eight 90 degree quick-connecting water line elbows (that also rotate freely 360 degrees) may be threaded into the eight water line apertures 138 to provide for such a connection. (These connectors are threaded into the manifold 24 in order to withstand the pressure at the reduction site, as will be discussed in more detail below.) A small O-ring is placed around the base of the 90 degree quick-connecting elbows prior to threading them into the water line apertures 138 to prevent leaks. The quick-connecting elbows provide for easy maintenance, and a no tools needed assembly of the water lines 30 to the manifold 24.

In accordance with the present invention, the water distribution manifold 24 preferably forms a closed loop, wherein there are at least two paths through the manifold 24 from the coupler 100 (where water enters the manifold 24 from the lift tube 92 and pump 28) to each of the water line apertures 138. Such a closed loop system provides for fail-safe operation, in that even if the manifold 24 is completely clogged at one point therein, water will continue to be provided to each of the water line apertures 138, and thus to all the water lines 30 in the system 20, via an alternative path through the manifold 24.

The water lines 30 preferably are formed of flexible tubing, such as ¼ inch vinyl tubing. The water lines 30 are connected at one end thereof to the water line apertures 138 in the water distribution manifold 24, e.g., via the quick-connecting water line elbows just mentioned. Appropriate T-connectors may be used along the water lines 30 to create a desired number of branches for the water lines 30 where the water lines 30 enter the growing chambers 26. For example, the water lines 30 may be formed by first inserting into each of the quick-connectors mounted on the water distribution manifold 24 a section (e.g., a seven inch long section) of ¼ inch long poly tube. Each of these poly tubes is then attached to the bottom of a ¼ inch double barbed T-connector. A section of ¼ inch vinyl tube of desired length is then attached to each remaining end of the ¼ inch double barbed T-connector. This creates two water lines 30 for each connection to the water distribution manifold. If two additional T-connectors are used for each connection to the water distribution manifold 24, four water lines 30 are provided for each connection to the water distribution manifold 24. In this case, for the exemplary water distribution manifold 24 illustrated and described herein, using such T-connectors a total of 32 water lines 30 may be provided for the growing chambers 26 from the eight water line apertures 138 formed in the distribution manifold 24. As will be discussed in more detail below, the multiple water lines 30 are inserted into the growing chambers 26 where they are attached to sprayers for spraying water and nutrients onto the roots of plants growing therein.

It should be noted that in an aeroponic plant growing system 20 in accordance with the present invention, the diameter of the water carrying tubes forming the water distribution manifold 24 preferably is at least four times the diameter of the of the water lines 30 that carry water from the manifold 24 to sprayers positioned in the growing chambers 26. (In the exemplary embodiment described herein, the diameter of the water distribution manifold 24 tubes is five times that of the water lines 30.) This ratio of manifold 24 diameter to water line 30 diameter ensures that proper pressure is achieved for creating a fine mist from the sprayers. Such a ratio allows a water/nutrient solution to be pushed further along the water lines 30, thereby allowing operation of more sprayers, and thus a larger system 20, without having to increase energy output from the pump 28 (the pump doesn't have to work as hard).

An exemplary growing chamber 26 for use in an aeroponic growing system 20 in accordance with the present invention will be described now with reference to FIG. 9. The growing chamber 26 preferably is cylindrical in shape. For example, the growing chamber 26 may be made of a section 148 (e.g., a five foot long section) of 6-inch Sc40PVC tube. A 6-inch Sc40PVC female adapter 150 is cemented to each end of the growing chamber tube 148. The female adapter 150 provides a threaded end at each end of the growing chamber tube 148. A removable 6-inch Sc40PVC male plug 152 threads into each of the female adapters 150, to cap the ends of the growing chamber 26. (Plumbers tape may be used on the threads to prevent leaks.) These plugs 152 may be removed easily when necessary to provide access to the interior of the growing chamber 26, e.g., for cleaning, maintenance, repair, etc. The threaded ends of the growing chamber 26 also make it easy to extend the length of the growing chamber 26, e.g., to expand the capacity of the system 20. For example, a growing chamber extension, formed in the manner of the growing chamber 26 described herein and having an appropriate threaded end or adaptor, may be threaded onto the female adapter 150 at one or both ends of the growing chamber 26, after the plug 152 has been removed, thereby to extend the effective length of the growing chamber 26.

A plurality of plant apertures 38 are formed in the growing chamber 26 to support the plants to be grown therein. The plant apertures 38 preferably are formed in a row along one side, hereinafter the top side, of the growing chamber 26. The plant apertures 38 preferably are evenly spaced along the top of the growing chamber 26. The number and size of the plant apertures 38 formed in any given growing chamber 26 may be selected based on such factors as the size and desired capacity of the growing chamber 26, the type of plant or type of plant support structure to be supported in the plant apertures, etc. For example, for the exemplary embodiment of the invention being described herein, seven 3½ inch diameter plant apertures are formed by drilling in each of the growing chambers 26.

The plant apertures 38 may support appropriate plant support structures 154. The type of plant support structures 154 to be used may be selected based on the type of plant to be grown, the method of growing (e.g., from seed or from cutting), etc. For example, for the exemplary embodiment of the invention described herein, the plant support structures 154 are 3¾ inch net pots with 3¾ inch neoprene inserts that are placed in the plant apertures 38 for support therein.

A drain hole 156 is formed in the bottom of the growing chamber 26, i.e., in the side thereof opposite the plant apertures 38. The drain hole 156 preferably may be formed near one end of the growing chamber 26, so that if the growing chamber 26 is tilted slightly, water in the bottom of the growing chamber 26 will be directed to the drain hole 156. For example, a 1¼ inch drain hole 156 may be formed by drilling though the bottom of the growing chamber 26 near one end thereof. A section 158 of 1¼ inch tubing is cemented into the drain hole 156 so as to extend outward and downward from the growing chamber 26. As will be discussed in more detail below, this section 158 of tubing provides a structure for coupling a drain line 34 to the growing chamber 26.

Water line apertures 160 are formed along the top of the growing chamber 26 to provide entry points for the water lines 30 into the interior of the growing chamber 26. Preferably, a water line aperture 160 may be formed centered between each plant aperture 38 formed in the growing chamber 26, with additional water line apertures 160 formed between the ends of the growing chamber 26 and the plant apertures 38 formed nearest to the ends of the growing chamber 26. For example, the water line apertures 160 may be formed as 1 inch diameter holes drilled through the plant chamber tube 148 at the desired locations thereon. A ¾ inch grommet is cemented into each of these 1 inch holes. The water lines 30 enter the growing chamber 26 via a ¼ inch grommet or pressure compensating dripper (e.g., "RAIND-RIP" brand pressure compensating dripper (National Diversified Sales, Inc., Lindsay, Calif.) that is removably plugged in the ¾ inch grommet. This removable grommet or pressure compensating dripper can be easily removed when needed in order to pull a water line 30 from the growing chamber 26. This allows the sprayers 162 that are attached to the water lines 30 in the growing chamber 26 to be accessed easily, e.g., for inspection, cleaning, replacement, etc., without having to open the ends of the growing chamber 26.

Sprayers 162 are attached to the water lines 30 running through the growing chamber 26 at positions along the water lines 30 such that water and nutrients carried by the water lines 30 from the water reservoir 22 are directed at the roots of plants supported in the plant apertures 38. The sprayers 162 preferably may be implemented using micro-misting spray nozzles, such as "MISTY MATE" brand micro-misting nozzles (Misty Mate, Inc. Gilbert Ariz.). Other types of sprayers 162, such as 360-degree sprayers, also may be used.

In accordance with the present invention, the sprayers 162 preferably are positioned on the water lines 30 in the growing chamber 26 such that water from at least two individual sprayers 162 is directed at each plant supported in a plant aperture 38. In the exemplary embodiment described herein, eight water lines 30 enter the growing chamber at the eight water line apertures 160 provided. Six of the water lines that enter the growing chamber 26 between plant apertures 38 each support two micro-misting spray nozzles 162, facing in opposite directions and directed at the roots of plants supported in the plant apertures 38 on each side of these water lines 30. The two water lines 30 entering the growing chamber 26 at the ends thereof each support a single micro-misting spray nozzle 162, directed at the roots of plants supported in the plant apertures 38 nearest the ends of the growing chamber 26. (The spray nozzles 162 may be attached to the water lines 30 using an appropriate T-connector.) Thus, water and nutrients are provided to the roots of each plant in the growing chamber 26 by two spray nozzles 162. This redundancy provides water and nutrients more evenly to the plant roots on both sides of the plant. It also prevents a plant's roots from completely drying out and subsequent damage to the plant should one of the spray nozzles 162 directed at the plant's roots fail or become blocked.

Figure 9:
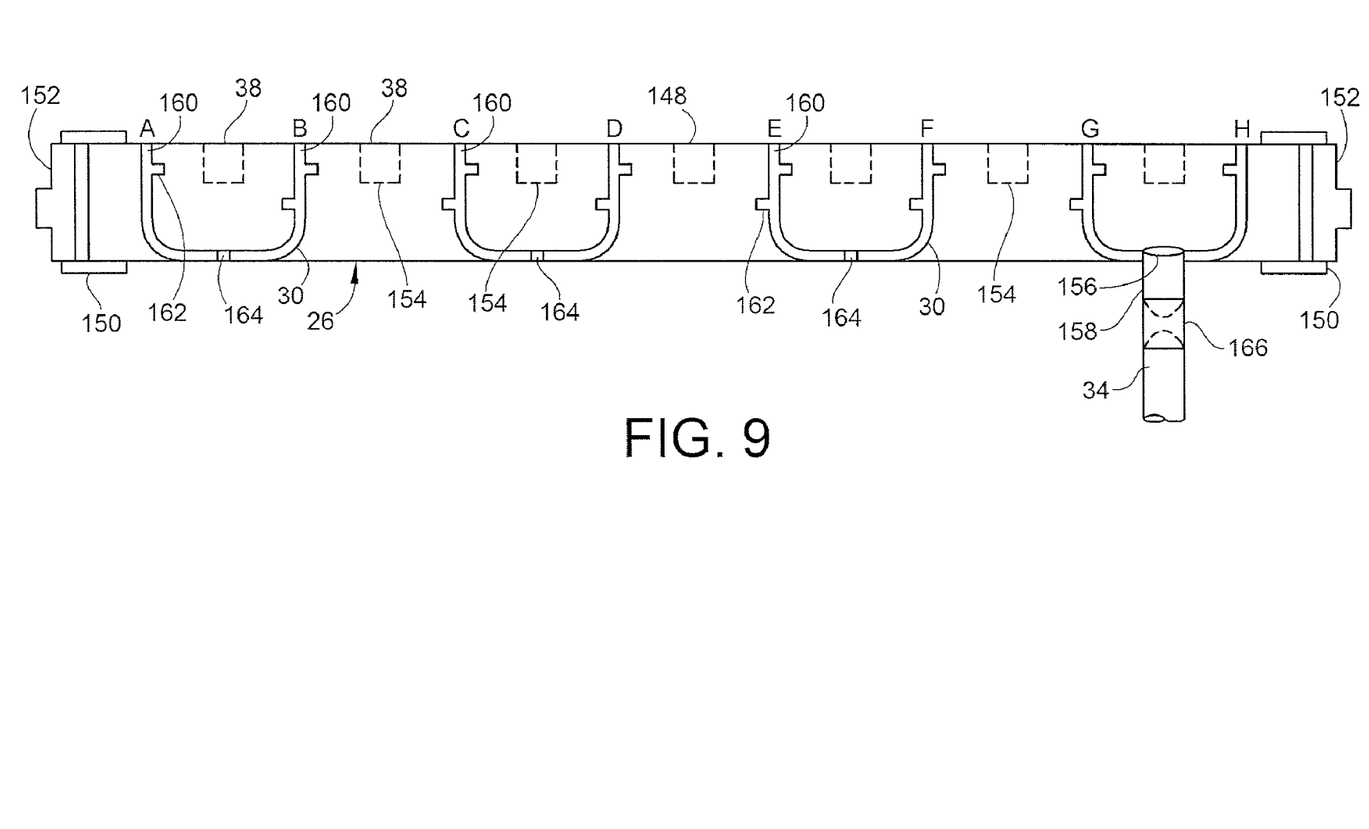
FIG. 9 is a side cross-section view of an exemplary growing chamber for use in an aeroponic plant growing system in accordance with the present invention.

As illustrated in FIG. 9, pairs of water lines 30 in the growing chamber 26 are coupled in fluid communication at the ends thereof using any appropriate connectors 164. (This connection could also be made outside the growing chamber 26.) This creates a closed loop system, wherein each sprayer 162 is provided with water via two water lines 30. If either of the water lines 30 supplying a given sprayer 162 should become blocked or otherwise fail, water will still be provided to the sprayer 162 from the other water line 30 to which the sprayer 162 is connected. Such a system further reduces the likelihood that a blockage or failure in the water line system will result in plant damage or death.

A 1¼ inch flexible coupler 166 is attached to the section 158 of 1¼ inch Sc40PVC tube that extends from the drain hole 156 in the growing chamber 26. The flexible coupler 166 is then attached to a drain line 34. For example, the drain lines 34 may be formed of sections of 1¼ inch Sc40PVC tubes. Alternatively, the drain lines 34 may be formed of flexible hose cut to the appropriate length and coupled to the growing chamber 26 via the tube section 158. As discussed above, the drain lines 34 return the unused water/nutrient solution from the growing chamber 26 to the reservoir 22. The ends of the drain lines 34 opposite the growing chambers 26 are positioned in the drain line apertures 58 formed in the reservoir lid above the filter 32, so that water and nutrients returned from the growing chambers 26 pass through the filter 32 before being re-combined with the water in the reservoir 22.

The placement of the filter system 32 at the ends of the drain lines 34 from the growing chambers 26 permits the use of a filter system 32 employing a variety of types of filter media that may be selected to suit specific growing conditions, as described above. Such positioning of the filter 32 in the aeroponic plant growing system 20 of the present invention also extends the operating life of the pump 28 by filtering the water returned from the growing chambers 26 prior to it being re-combined with the water in the reservoir 22. If the filter were placed at the pump inlet, as is common in many applications, the pump 28 will start to overwork as soon as the filter starts to clog. If the filter is placed on the discharge side of the pump 28 debris would be allowed to pass through the pump 28, potentially causing internal damage to the pump 28. Also, as such a filter begins to clog, back pressure is created in the pump 28, causing it to overwork. This will also decrease the water pressure provided at the sprayers 162 in the growing chambers 26, potentially rendering them inoperable. All of these problems are eliminated by placing the filter system 32 at the end of the drain lines 34, as described herein.

The growing chambers 26 of an aeroponic growing system 20 in accordance with the present invention may be supported on a growing chamber table 170, or similar structure. The growing chamber table 170 may be made in a conventional manner of conventional materials, such as wood. Appropriate structures are provided on the growing chamber table 170 to support any selected number of growing chambers 26 in accordance with the present invention in an appropriate manner, e.g., to keep the growing chamber tubes 148 from rolling on the table 170. The growing chamber table 170 may be made adjustable. For example, the height of the growing chamber table 170 may be made adjustable. As the plants growing in a growing chamber 26 get larger, the table 170 may then be lowered to maintain the distance between the plants and any light source positioned above the growing chambers 26. The spacing between the growing chambers 26 on the table 170 preferably may be made adjustable as well. As the plants growing in a growing chamber 26 get larger they may need to be spaced further apart. Thus, the growing chamber table 170 preferably may provide for locking the growing chambers 26 into various different positions on the growing chamber table 170. In accordance with the present invention, the growing chambers 26 are modular components connected to the rest of the system 20 by flexible and/or easily movable water lines 30 and drain lines 34. Thus, the growing chambers 26 may be moved on the growing chamber table 170 as needed to accommodate plant growth at any time, even without shutting down system operation.

The exemplary aeroponic growing system 20 described herein is well adapted for relatively small applications, such as for personal or hobby use or for use in laboratory research settings. It should be understood, however, that aeroponic growing systems in accordance with the present invention may also be used for larger applications, such as nurseries, greenhouses, agricultural applications, and larger research facilities. Exemplary modifications to an aeroponic growing system in accordance with the present invention for such larger applications are discussed below.

For agricultural and research applications, an aeroponic growing system 20 in accordance with the present invention may have larger diameter growing chambers and support a larger net pot size. For example, a 12-inch, 18-inch, or even 24-inch diameter growing chamber may be used. An increased number of sprayers per growing site may be required, as well as a larger water reservoir and increased drain line size. The water distribution manifold may not need to be increased in diameter, but may need to be adjusted in length. Also, for an outdoor system, schedule 40 PVC may become brittle in temperature changes, so schedule 80 PVC may be used instead for the various system components. Such an enlarged system may be used, for example, for corn cultivation. Aeroponic growing of corn is important because of the importance of corn to ethanol production, which could be a significant future fuel resource. With an aeroponic growing system of this type genetic research can be developed in ½-¼ of the time that growing plants in soil under normal conditions would allow. This means that a 10 year strain of corn could be developed and tested in 2½ to 5 years.

As discussed above, the growing chamber size may be increased by the use of threaded growing chamber extensions. These extensions could be any diameter tube cut to any length, e.g., between 1 foot and 20 feet. Growing chamber extensions may be attached to an extant growing chamber 26 by unscrewing the male plug 152 on the end of the growing chamber 26, and threading onto the end of the growing chamber 26 a male adapter end of the growing chamber extension tube. The removed male plug 152 may then be threaded into the female adapter at the other end of the extension tube, thereby to re-close the open end of the expanded growing chamber. This may be done repeatedly until desired area is covered.

It is understood that the invention is not confined to the particular construction and arrangement of parts herein illustrated and described, but embraces such modified forms thereof as come within the scope of the following claims.

What is claimed is:

1. An aeroponic plant growing system, comprising:
   (a) a water reservoir for holding water;
   (b) a plurality of growing chambers, wherein each growing chamber includes a plurality of plant apertures formed therein for supporting plants growing in the growing chamber;
   (c) a pump for pumping water from the water reservoir;
   (d) a water distribution manifold coupled to the pump to receive the water pumped from the water reservoir by the pump and to distribute the water received from the pump to a plurality of water line apertures formed therein, wherein the water distribution manifold is formed as a closed loop such that there are at least two paths through the water distribution manifold from a point where water from the pump is received by the water distribution manifold to each of the water line apertures;
   (e) a plurality of water lines coupled to the water line apertures on the water distribution manifold and extending into the plurality of growing chambers;
   (f) sprayers coupled to the water lines in the growing chambers and positioned to spray water received on the water lines at roots of plants supported in the plant apertures, wherein the water lines extending from the growing chambers are formed in a closed loop such that there are at least two paths through the water lines to the sprayers;
   (g) drain lines coupled between the growing chambers and the water reservoir to return excess water from the growing chambers to the water reservoir; and
   (h) a filter positioned with respect to the drain lines and the water reservoir such that water in the drain lines passes through the filter before being combined with the water held in the water reservoir, wherein the filter includes a plurality of different types of filter media, including at least one type of filter medium adapted to support the growth of organisms beneficial to plant growth.

2. The aeroponic plant growing system of claim 1 wherein the plurality of plant growing chambers are cylindrical chambers having the plant apertures formed along one elongated side thereof and having removable ends.

3. The aeroponic plant growing system of claim 1 wherein the filter includes a plurality of filter trays and wherein each of the plurality of filter trays includes a different type of filter medium.

4. The aeroponic plant growing system of claim 3 wherein the plurality of filter trays are positioned side-by-side in a filter system.

5. The aeroponic plant growing system of claim 4 wherein the water reservoir includes a lid and wherein the filter system is mounted to an underside of the reservoir lid.

6. The aeroponic plant growing system of claim 1 wherein the plurality of different types of filter media are selected from the group of different types of filter media consisting of crushed coral, activated carbon, coco fiber, natural fiber materials, and bio balls.

7. The aeroponic plant growing system of claim 1 wherein the filter includes an air space adjacent to the filter medium adapted to support the growth of organisms beneficial to plant growth.

8. The aeroponic plant growing system of claim 1 wherein a cross-sectional area of the water distribution manifold perpendicular to water flow through the water distribution manifold is at least four times a cross-sectional area of the water distribution lines perpendicular to water flow through the water lines.

9. The aeroponic plant growing system of claim 1 wherein the sprayers are positioned in the growing chambers such that water is sprayed at roots of plants in the plant apertures from at least two separate sprayers.

10. An aeroponic plant growing system, comprising:
    (a) a water reservoir for holding water;
    (b) plurality of growing chambers, wherein each growing chamber includes a plurality of plant apertures formed therein for supporting plants growing in the growing chamber;
    (c) a pump for pumping water from the water reservoir;
    (d) a water distribution manifold coupled to the pump to receive the water pumped from the water reservoir by the pump and to distribute the water received from the pump to a plurality of water line apertures formed therein, wherein the water distribution manifold is formed as a closed loop such that there are at least two paths through the water distribution manifold from a point where water from the pump is received by the water distribution manifold to each of the water line apertures;
    (e) a plurality of water lines coupled to the water line apertures on the water distribution manifold and extending into the plurality of growing chambers;
    (f) sprayers coupled to the water lines in the growing chambers and positioned to spray water received on the water lines at roots of plants supported in the plant apertures;

(g) drain lines coupled between the growing chambers and the water reservoir to return excess water from the growing chambers to the water reservoir; and (h) a filter positioned with respect to the drain lines and the water reservoir such that water in the drain lines passes through the filter before being combined with the water held in the water reservoir.

11. The aeroponic plant growing system of claim 10 wherein the water lines extending into the growing chambers are formed in a closed loop such that there are at least two paths through the water lines to each sprayer.

12. The aeroponic plant growing system of claim 10 wherein the plurality of plant growing chambers are cylindrical chambers having the plant apertures formed along one elongated side thereof and having removable ends.

13. The aeroponic plant growing system of claim 10 wherein the filter includes a plurality of different types of filter media, including at least one type of filter medium adapted to support the growth of organisms beneficial to plant growth, wherein a cross-sectional area of the water distribution manifold perpendicular to water flow through the water distribution manifold is at least four times a cross-sectional area of the water distribution lines perpendicular to water flow through the water lines, and wherein the sprayers are positioned in the growing chambers such that water is sprayed at roots of plants in the plant apertures from at least two separate sprayers.

* * * * *